June 24, 1969     P. T. SCHURMAN ET AL     3,452,125
METHOD OF AND APPARATUS FOR BLOW MOLDING THERMOPLASTIC MATERIAL
Original Filed Dec. 21, 1964

INVENTORS
Peter T. Schurman and
Raymond C. Confer
BY
ATTORNEY

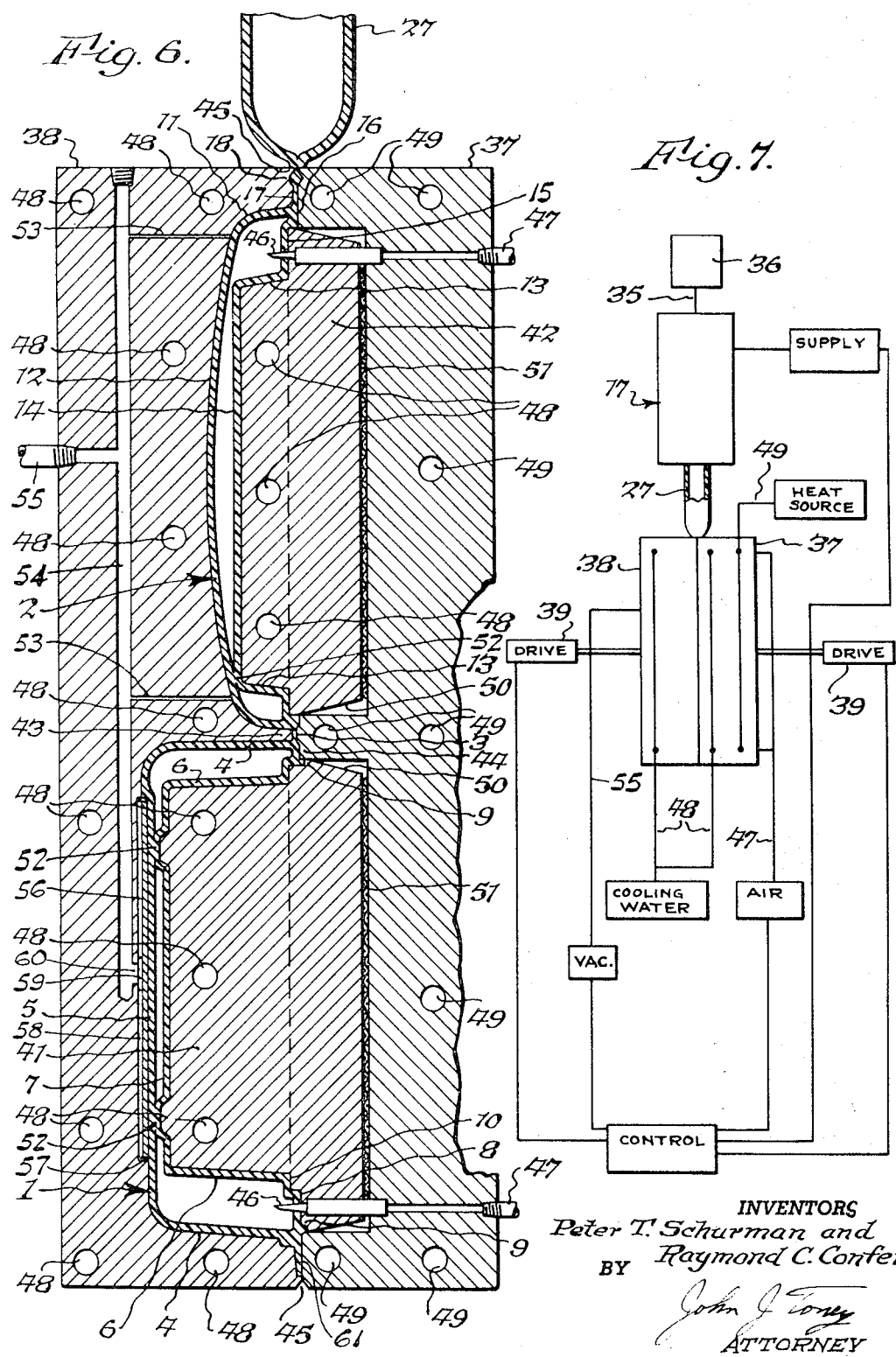

United States Patent Office 3,452,125
Patented June 24, 1969

3,452,125
METHOD OF AND APPARATUS FOR BLOW MOLDING THERMOPLASTIC MATERIAL
Peter T. Schurman, Snyder, and Raymond C. Confer, Gasport, N.Y., assignors to W. R. Grace & Co., New York, N.Y., a corporation of Connecticut
Original application Dec. 21, 1964, Ser. No. 420,023. Divided and this application Mar. 3, 1967, Ser. No. 646,770
Int. Cl. B29d 23/03; B29c 17/07
U.S. Cl. 264—89                                   6 Claims

ABSTRACT OF THE DISCLOSURE

A method of blow molding a container by placing a plastic parison between mold sections, evacuating air from between the parison and at least one mold section and blow molding the parison in the mold. The parison is divided into two separate but integral double wall compartments, the top and bottom of the container, by pinching the parison upon itself to form a hinge.

---

This application is a division of our copending application, Ser. No. 420,023, filed Dec. 21, 1964, now Patent No. 3,317,955, which is a continuation-in-part of our pending application Ser. No. 369,159, filed May 21, 1964, now abandoned.

This invention relates generally to the blow molding of thermoplastic material, and more specifically to a new and useful method of blow molding thermoplastic articles. While not limited thereto, our invention is particularly concerned with the molding of plastic containers of one-piece construction having a body part and a cover part hinged thereto, of the type disclosed in said application Ser. No. 369,159.

Heretofore such containers have been injection molded, producing a one-piece construction which is relatively flimsy and relatively expensive as compared to containers using steel or other non-plastic material. As a result, such containers have not achieved their full potential.

A primary object of our invention is to provide a method of molding plastic containers of one-piece construction having hinged body and cover parts which are substantially stronger and more rigid than prior art constructions of this general type.

Another object of our invention is to provide a method of molding a one-piece plastic container having hinged body and cover parts at least one of which is of double wall construction.

It is also an object of our invention to provide a method of molding a one-piece plastic container having hinged body and cover parts at least one of which has a double wall construction, wherein either wall can be changed independently of the other.

In addition, it is an object of our invention to provide a method of molding a plastic container having mating parts joined by an integral hinge, one of the container parts being of hollow, double wall construction and the other part comprising a single wall shell.

In carrying out our invention in one aspect thereof, the two hinged parts of a container are blow molded, to form a double walled envelope for each part. One side of the envelope comprises an exterior wall of one side of the part while the other side of the envelope forms an interior wall thereof. This is accomplished by closing complementary mold parts about a tubular extrusion of molten plastic material, the mold parts having portions coacting to provide a pair of adjacent cavities. The parts forming the interior walls project into the cavity parts forming the exterior walls, leaving sufficient space for blow molding the desired double wall structure. As the mold parts close they pinch the extrusion around the cavities to form the meeting edges and simultaneously form a connecting hinge by complementary parts extending between the two cavities.

However, a problem arises when the interior wall forming parts approach the exterior wall forming parts too closely, because that portion of the extrusion intended to engage the exterior wall forming part has a tendency in its molten state to collapse inwardly against that portion of the extrusion which is being forced into the cavity by the projecting, interior wall forming part, whereupon the desired structure cannot be formed.

Therefore, another object of our invention is to provide a method of and means for controlling the tubular extrusion as the mold sections are brought together, to prevent undesired collapsing of the tubular walls against each other.

Another problem arises in providing a hinge having sufficient fatigue life. The mold is cooled to set the tubular extrusion as the mold sections are engaged thereabout. While the resulting double wall envelopes comprising the hinged parts have a flex life sufficient for the intended purpose, the hinge is subject to stresses and strains which tend to materially reduce its useful flex life.

Therefore, another object of our invention is to provide a method and means whereby the stresses and strains in the hinge section are relieved during the molding process, to produce a longer lasting hinge.

The method of molding a container having mating parts joined by a hinge, in accordance with our invention, is characterized in one aspect thereof by the steps of extruding tubing of thermoplastic material, pinching the tubing completely thereacross at three locations spaced therealong, thereby providing in the tubing a pair of hollow compartments separated by a pinched hinge portion, and expanding the tubing compartments within a pair of blow mold cavities to form the article parts.

The foregoing and other objects, advantages and characterizing features of the method of our invention will become clearly apparent from the ensuring detailed description thereof, considered in conjunction with the accompanying drawings wherein like reference numerals denote like parts throughout the various views and wherein:

FIG. 6 is a vertical sectional view, on an enlarged scale, through molding apparatus of our invention, showing the mold sections closed about a tubular parison to form a hinged container in accordance with the method of our invention; and FIG. 7 is a schematic layout of a complete apparatus of our invention.

Figure 5:
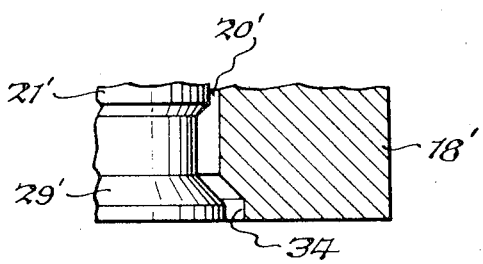

Referring now to the accompanying drawings, there is shown apparatus of our invention for molding a hinged thermoplastic container of the type illustrated and described in our aforesaid application Ser. No. 369,159. As shown in FIG. 6, which corresponds to FIG. 5 of our said application except that the container is inverted, this being the preferred molding position, the container comprises mating parts 1 and 2 joined by a hinge 3 integral therewith. Part 1 comprises a relatively deep body part of hollow, double wall construction formed by an outer shell having opposite end and side walls 4 and a bottom wall 5, and an inner shell having opposite end and side walls 6 and a bottom wall 7. Side and end walls 4 of the outer shell are joined to the side and end walls 6 of the inner shell by a peripheral flange in the form of a ledge 8 completely encircling the inner shell. An upstanding rib 9 is formed on ledge 8, for indexing purposes.

In like manner, part 2 comprises a relatively shallow top cover part of hollow, double wall construction having an outer shell formed by opposite end and side walls 11 and a bottom wall 12, and an inner shell formed by opposite end and side walls 13, and a bottom wall 14. The inner and outer side and end walls 13, 11 are joined by a peripheral flange in the form of an inwardly offset ledge 15 encircled by a skirt 16 and completely encircling the inner shell.

Of course, parts 1 and 2 can be of the same size, and part 2 can be larger or deeper than part 1, if desired.

Figure 1:
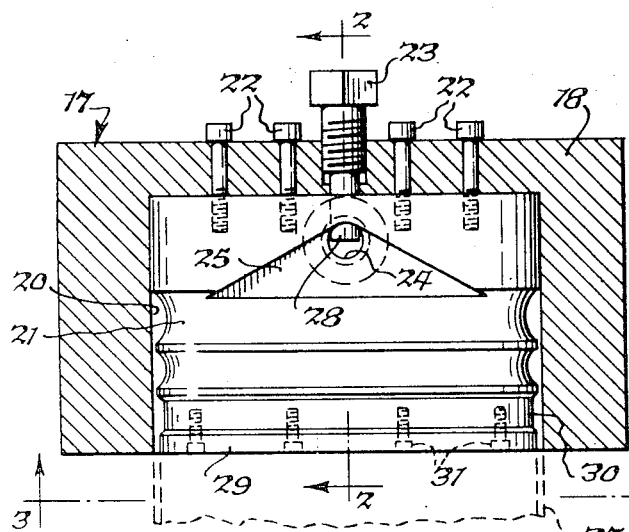
FIG. 1 is a vertical sectional view through an extrusion die of our invention.
Figure 2:
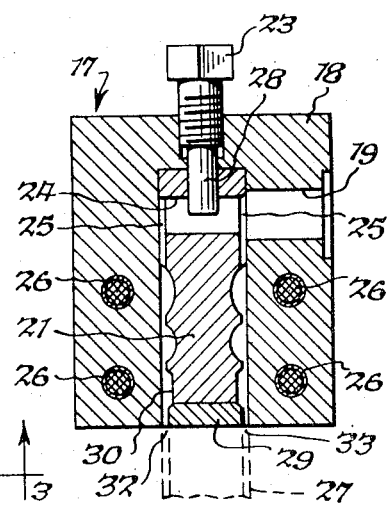
FIG. 2 is a vertical sectional view thereof, taken about on line 2—2 of FIG. 1.
Figure 3:
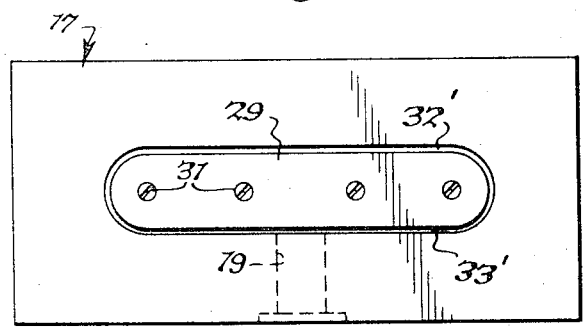
FIG. 3 is a bottom plan view thereof.

In accordance with our invention, body and cover parts 1 and 2 are molded integrally with hinge 3, in one piece, this being accomplished by a blow-molding operation as follows:

Molten plastic material, not shown, is fed into an extrusion die 17 by conventional feed means, not shown, from a suitable supply (FIG. 7). The extrusion die 17, as shown in FIGS. 1–3, includes a die body 18 having an inlet opening 19 through one side, the opening 19 communicating with a vertical bore 20 opening downwardly through die body 18. Preferably bore 20 is not circular, as is conventional, but is laterally elongated, having generally parallel flat sides and curved ends.

A mandrel 21 is positioned in bore 20, the upper portion of the mandrel having a sliding fit in bore 20 and the lower portion of the mandrel having a cross sectional configuration generally concentric with body 18 around bore 20 and spaced therefrom to define a tubular extrusion passage. Mandrel 21 is positioned in bore 20 as by bolts 22 which extend through the upper end of die body 18 and are threaded into the upper end of mandrel 21 on opposite sides of a bolt valve 23 to be described. Mandrel 21 has a lateral passage 24 therethrough, comprising a continuation of inlet passage 19. Also, the upper portion of mandrel 21 has downwardly opening recesses 25 of downwardly diverging side wall form on opposite sides thereof, communicating with passages 19 and 24 and with the tubular extrusion passage along the elongated sides thereof.

Raw material fed through inlet opening 19 is held at plasticizing temperature by means such as cartridge-type electric heaters 26, of a type known in the art, positioned in body 18. The heated die body causes the thermoplastic material to remain molten, and semi-fluid, and this semifluid material flows into the upper end of bore 20. Some of the molten material flows through the recess 25 immediately adjacent passage 19, downwardly along the near side of the mandrel, while some molten material flows through mandrel passage 24 to the far recess 25, whereby the molten plastic material is caused to surround mandrel 21 and move downwardly therealong. The lower portion of mandrel 21 is spaced from the side wall of the bore 20 to define a tubular extrusion passageway which fills with the molten thermoplastic material to extrude a tubular parison 27 of laterally elongated, flat-sided form.

The extrusion of a laterally elongated, flat-sided parison offers many advantages. Such a tube tends to be nondirectional, unlike a circular tube, and furthermore has the approximate shape of the container to be molded as shown in FIG. 6. If a circular tube were used, an undesirably large diameter often would be required.

The flow of molten plastic through the mandrel passage 24 can be regulated by bolt valve 23 which is threaded in the upper end of die body 18. Bolt 23 has a rotary valve end 28 extending through the upper end of mandrel 21 into the passage 24 for variably restricting the same.

The cross-sectional shape and wall thickness of the parison 27 is determined by a plate 29 mounted on the lower end of mandrel 21 which is recessed immediately above the plate, as indicated at 30. Plate 29 is secured to mandrel 21 as by screws 31, whereby it can be detached and replaced by a plate of different configuration. In this way, parisons of different wall thicknesses can be extruded from a single die 17.

Figure 4:
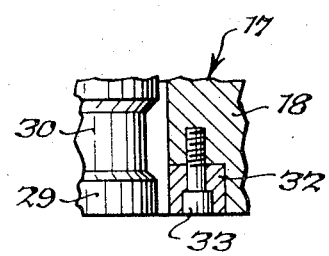
FIGS. 4 and 5 are corresponding, fragmentary detail views of modified extrusion die constructions.

Instead of a removable plate 29 coacting with a fixed wall of bore 20, the lower end of the mandrel can be fixed and permanent, with the die body having a removable insert 32 forming the lower end of the bore wall as shown in FIG. 4. Insert 32 can be detachably secured in place as by bolts 33 for replacement by an insert of different configuration to provide an extrusion of different side wall form.

Plate 29 and insert 32 can be designed to provide an extrusion having different wall thicknesses therearound. In FIG. 3, for example, one side 32' of the extrusion passage is approximately twice as wide or thick as the opposite side 33'. In addition to providing opposite side walls of different thicknesses, a given side wall can have portions of different thickness by appropriately recessing or embossing either the removable plate 29 or the removable rim insert 32.

Also, the extruded parison 27 can be provided with axially spaced sections of different thickness. This can be accomplished, for example, by providing a die body 18' (FIG. 5) having an undercut inner wall 34 at the lower end of extrusion bore 20'. The mandrel 21' has a plate 29' which can be detachable and which projects beneath the overhang of wall 34. By providing the mandrel with lift jacks as indicated at 35 (FIG. 7) actuated by hydraulic-pneumatic, or other forms of motor indicated at 36 the mandrel can be raised and lowered to vary the spacing between the plate 29' and wall 34. This will vary the wall thickness of the parison as it is extruded. In accordance with our invention, the extruded parison 27 is passed between paired mold sections generally designated 37, 38 which are mounted for movement into and out of engagement about parison 27. Mold sections 37, 38 can be pivotally mounted or otherwise supported and can be moved by conventional drive means 39.

Mold section 37 comprises a plate section, having a body 40 and removable cores 41, 42. Core 41 is mounted in a recess in body 40, the portions of the core projecting from body 40 having surfaces defining the inner wall, ledge and rib portions 6, 7, 8, 9 and 10 of the inner shell of container body part 1. Core 42 is mounted in another recess in body 40, and its projecting surfaces are formed to define the inner shell portions 13, 14 and 15 of container cover part 2. Mold section 38 is recessed to define the outer shell portions of container parts 1 and 2.

Thus, mold sections 37, 38, when engaged, define a pair of cavities. One cavity has the shape of one container part, and the other cavity has the shape of the other container part. Mold section 38 defines the outer shell configuration of the molded article, and mold section 37 the inner shell configuration thereof. It is a feature of our invention that the configuration of either inner shell can be changed without changing the configuration of the other and without changing either outer shell configuration. This is accomplished by removing the appropriate core 41, 42, which are simply bolted in place from behind, through body 40, and replacing it with another core having the desired configuration.

Mold section 38 and body 40 are provided with opposed land portions 43, 44, respectively, which are arranged to pinch the parison between them, welding the opposite side walls of the parison together and forming the hinge 3. Mold section 38 also is provided with a knife-edge formation 45, extending completely around the cavities except at the hinge and adapted to engage against the mold body 40 as a bed plate for pinching and severing the enclosed parison portion.

Thus, upon closing mold sections 37, 38 about the parison 27, a portion thereof is enclosed. The mold sections pinch off the enclosed portion, and simultaneously pinch form the hinge 3, thereby dividing the enclosed parison portion into a pair of hollow sections positioned within the mold cavities and separated by hinge 3. Mold section 37 carries means for introducing expansion fluid into each hollow parison section, such means comprising a pair of needles 46 which are mounted in section 37 and project beyond the cavity defining faces thereof through the wall of the enclosed parison. A source of compressed air is connected via conduit 47 to each needle 46, for introducing compressed air into each of the hollow parison sections, thereby expanding them into engagement with the cavity walls, causing the parison sections to assume the shape of the cavities. Cores 41, 42 and the mold 38 are cooled, as by cooling water ducts 48 connected to a suitable source of cooling fluid. This cools and sets the molded plastic, causing it to retain the mold configuration.

Thus, with the method and apparatus of our invention there is provided a one-piece plastic container having mating parts joined by an integral hinge, all in a single blow-molding operation. The resulting container has many advantageous features, as pointed out for example in our application Ser. No. 369,159 to which reference is hereby made for additional details concerning the container itself.

Where a single wall construction is desired, the inner shell of either part 1, 2 can be either wholly or partially removed, as by severing with a circular cutting saw. Preferably, this is done by cutting through the side and end walls 6, 13, as the case may be, as described in our said application with reference to FIG. 4 thereof.

It is a particular feature of our invention that the plastic parison can be pinched very thin by the knife edge 45 easily and without using great force. In accordance with our invention, mold body 40 is heated, as by cartridge heating elements 49, in the area against which the knife edge formation 45 engages. The heated body 40 maintains the parison at or near its plasticizing temperature and therefore in a molten, semi-fluid condition at the area of pinching, as the mold sections close, whereby the weight of the molds themselves is sufficient to cut almost through the plastic. This is accomplished during the blow molding operation, without requiring special cutting equipment or the tons of force required to pinch off a cooled plastic.

It is a further feature of our invention that a hinge of long flex life is provided, notwithstanding the cooling of the expanded parison sections in the mold. This is accomplished by heating the land 44 to a temperature maintaining the pinched hinge web in a semi-fluid condition long enough to relieve stresses and strains set up in the pinched hinge web.

It will be noted that mold section 37 is simultaneously heated in part and cooled in part. Therefore, cores 41, 42 are substantially insulated from body 40. This is accomplished by bevelling or tapering the side wall portions of the cores 41, 42 away from the side walls of the recesses in which they are seated, as shown at 50, and by spacing the inner faces of the cores from the bottom walls of the recesses, thereby providing insulating dead air spaces between body 40 and the core portions seated in the recesses. Further, the spaces between the inner faces of cores 41, 42 and the bottom walls is filled with heat insulating and/or dissipating spacing material, such as the wire screening 51. As a result, cores 41, 42 contact body 40 only adjacent the outer edges of the recesses, and the desired heating of body 40 does not interfere with the desired cooling of cores 41 and 42.

It will be appreciated that the illustrated arrangement of cooling ducts 48 and heaters 49 is schematic, and that the same are provided in sufficient numbers and at proper locations to achieve the desired result.

In the illustrated container, the inner shells of the parts 1 and 2 approach the outer shells thereof very closely. Indeed, they are welded together at spaced locations 52 for added reinforcement as described in our aforesaid application, although this need not necessarily be done. Where welding is desired, the cores 41, 42 are shaped accordingly. However, a problem of undesired welding together arises because of the close positioning of the inner and outer shells. There is a tendency for the parison portions 5, 12 to fall away from the mold 38 and collapse against portions 7, 14 as the mold sections close about the parison. If this occurs, at any point, the opposite wall portions of the parison weld together, preventing subsequent expansion in the mold cavity. Therefore, it is a particular feature of our invention that means are provided for controlling those portions of the parison intended to engage the recessed cavity faces, the opposite parison portions being maintained under control by the projecting cores 41, 42.

The desired control is provided by evacuating or withdrawing air from between the cavity faces of mold section 38 and the adjacent wall sections of the enclosed parison. This can be accomplished in various ways. In the illustrated embodiment, air is withdrawn from between the plastic wall section 12 and the adjacent cavity face of mold section 38 through vacuum passages 53 which are of extremely small diameter, for example .03 inch, and which communicate with a manifold passage 54 through the mold section 38. Manifold passage 54 communicates with an appropriate source of suction through a conduit 55. In the case of the outer shell of container part 1, the wall portion 5 thereof is defined in part by a removable insert plate 56 mounted on the mold section 38 from behind, as by bolts or the like. Plate 56 is provided with a slight clearance therearound, between it and the surrounding portion of mold section 38, this clearance being indicated at 57 and being on the order of .01 inch. The rear face of plate 56 is provided with transverse grooves extending between the opposite edges thereof, in generally right angular relation, as indicated at 58 and 59, for placing the clearance 57 in communication with the manifold passage 54, through the connecting passage 60.

Thus, as the mold sections 37, 38 are closed about the parison, air is withdrawn from between the parison and the cavity faces of mold section 38. A strong suction source is not essential. All that is required is to relieve the pressure of air trapped between the parison and the cavity faces of mold section 38, which trapped air otherwise prevents the parison from following the contour of the mold section 38 as the mold sections are engaged about the parison. The clearance space 57 and passages 53 are so small as to preclude the passage of plastic therethrough, while being sufficient to permit the desired withdrawal of air. Such withdrawal takes place as the mold sections 37, 38 close about the extruded parison, prior to the introduction of expansion fluid through needles 46. The introduction of expansion fluid causes the parison envelopes to expand into conformance with the surface defining faces of their respective cavities, undesired inward collapsing of the parison wall being avoided by such expansion. Also, it will be appreciated that the oblong, flat sided shape of the parison, approximating the outline configuration of the container in its open position, assists in providing a controlled expansion of the hollow parison sections within the cavities.

The feeding of the raw plastic material, the opening and closing of the mold sections and the heating and cooling thereof, the withdrawal of air from between the parison and mold section 38 and the introduction of expansion fluid all are controlled by suitable programming means, which also can control the lifting and lowering motor 36 connected to the extrusion die mandrel. Such controls are conventional, in and of themselves, and therefore are only schematically indicated in FIG. 7.

In addition to forming the hinge 3, mold sections 37, 38 can be arranged to form a fastener tongue 17 having an enlarged head 18 as disclosed in our said application Ser. No. 369,159, and a flange 61 corresponding to the flange 20 of said application and adapted for interlocking engagement with the fastener tongue 17 in the manner set forth therein.

Accordingly, it is seen that our invention fully accomplishes its intended objects. The method and means of our invention can be used with any suitable thermoplastic material, such as high density polyethylene, polypropylene, polyvinyl and elastomeric polyolefin, which are given by way of example only.

Having fully disclosed and completely described our invention, together with its mode of operation, what we claim as new is:

1. The method of molding a container having mating parts joined by a hinge which comprises extruding a length of laterally elongated flat sided tubing of thermoplastic material, closing said length of tubing at its opposite ends, pinching a portion of said tubing upon itself intermediate its ends and dividing said tubing into a pair of hollow compartments and providing a hinge web between said compartments, applying plasticizing heat to said tubing portion during pinching thereof, moving cavity-defining mold sections into engagement about the parison to enclose a portion thereof, withdrawing air from between the enclosed parison portion and one mold section to cause adherence of the former to the latter and thereby preclude inward collapsing of the former, moving said cavity-defining mold sections together until one section projects inwardly into another section a substantial distance, expanding said tubing compartments by blowing within a pair of mold cavities by introducing a fluid into said tubing compartments through fluid conducting means communicating with the interior of each of said hollow compartments to form said container parts and cooling said compartments as they are expanded, said cooling and said applying of plasticizing heat being applied simultaneously through different parts of the mold.

2. The method of molding a container having mating parts joined by a hinge which comprises extruding a length of tubing of thermoplastic material, closing said length of tubing at its opposite ends, pinching a portion of said tubing upon itself and dividing said tubing into a pair of hollow compartments and providing a hinge web between said compartments, moving cavity-defining mold sections into engagement about the parison to enclose a portion thereof, withdrawing air from between the enclosed parison portion and one mold section to cause contact of the former with the latter and thereby preclude inward collapsing of the former, moving said cavity-defining mold sections together until one section projects inwardly into another section a substantial distance, expanding said tubing compartments by blowing within a pair of mold sections by introducing a fluid into said tubing compartments through fluid conducting means communicating with the interior of each of said hollow compartments to form said container parts.

3. The method of molding a container having mating parts joined by a hinge which comprises extruding a length of tubing of thermoplastic material, closing said length of tubing at its opposite ends, pinching a portion of said tubing upon itself and dividing said tubing into a pair of hollow compartments and providing a hinge web between said compartments, moving cavity-defining mold sections into engagement about the tubing to enclose a portion thereof, moving said cavity-defining mold sections together until one section projects inwardly into another section a substantial distance, evacuating air from between the enclosed tubing portion and at least one mold section to bring about contact of the former with the latter, expanding said tubing compartments by blowing within a pair of mold sections by introducing a fluid into said tubing compartments through fluid conducting means communicating with the interior of each of said hollow compartments to form said container parts.

4. The method of blow molding hollow plastic articles which comprise extruding a tubular parison of plastic material; moving cavity-defining mold sections into engagement about the parison to enclose a portion thereof; withdrawing air from between the enclosed parison portion and one mold section to cause adherence of the parison portion to the mold and position the parison in the mold, precluding inward collapsing of the parison; and introducing fluid through fluid conducting means communicating with the interior of said parison into the enclosed parison portion to expand it within the mold cavity.

5. The method of producing a container having two parts each of double walls construction and joined by an integral hinge, said method including the use of mold sections and comprising the steps of: taking a plastic member having opposed walls and placing it between said mold sections; withdrawing air from between the enclosed plastic member and one mold section to cause contact of the former with the latter and thereby preclude inward collapsing of the former; moving said mold sections together until one mold section projects inwardly into an opposed mold section to the extent of penetration that could bring about inward collapse of the plastic member upon itself if no vacuum was used and compressing and pinching together said opposed walls of said member in predetermined areas to define two separate but integral double wall compartments with a pinch area therebetween; and forming said compartments into desired shape by a blow molding operation; and said pinched area later constituting the integral hinge joining said compartments.

6. The method of claim 5 wherein the hinge is flexed closing the container parts into mating closure position.

References Cited

UNITED STATES PATENTS

| | | | |
|---|---|---|---|
| 3,334,164 | 8/1967 | Samuels et al. | 264—90 |
| 2,687,157 | 8/1954 | Cowan. | |
| 2,991,500 | 7/1961 | Hagen | 264—96 X |
| 3,004,285 | 10/1961 | Hagen. | |
| 3,148,103 | 9/1964 | Gallagher | 264—92 X |
| 3,167,104 | 1/1965 | Wiley et al. | |
| 3,242,245 | 3/1966 | Greig et al. | 264—90 X |
| 3,359,602 | 12/1967 | Bailey. | |

FOREIGN PATENTS

| | | |
|---|---|---|
| 654,579 | 6/1963 | Italy. |
| 1,349,717 | 12/1963 | France. |
| 39/3,581 | 3/1964 | Japan. |

DONALD J. ARNOLD, *Primary Examiner.*

T. J. CARVIS, *Assistant Examiner.*

U.S. Cl. X.R.

18—5; 264—98

Disclaimer 3,452,125.—*Peter T. Schurman*, Snyder, and *Raymond C. Confer*, Gasport, N.Y. METHOD OF AND APPARATUS FOR BLOW MOLDING THERMOPLASTIC MATERIAL. Patent dated June 24, 1969. Disclaimer filed June 14, 1972, by the assignee, *W. R. Grace & Co.*

Hereby disclaims the portion of the term of the patent subsequent to May 9, 1984.

[*Official Gazette September 19, 1972.*]